United States Patent
Fleury et al.

(10) Patent No.: US 8,678,641 B2
(45) Date of Patent: Mar. 25, 2014

(54) PROCESS AND APPARATUS FOR TREATING VISCOUS PRODUCTS

(75) Inventors: Pierre-Alain Fleury, Ramlinsburg (CH); Pierre Lichti, Muttenz (CH)

(73) Assignee: List Holding AG, Arisdorf (CH)

(*) Notice: Subject to any disclaimer, the term of this patent is extended or adjusted under 35 U.S.C. 154(b) by 0 days.

(21) Appl. No.: 13/467,561

(22) Filed: May 9, 2012

(65) Prior Publication Data

US 2012/0217330 A1    Aug. 30, 2012

Related U.S. Application Data

(62) Division of application No. 12/295,094, filed as application No. PCT/EP2007/002739 on Mar. 28, 2007, now Pat. No. 8,222,355.

(30) Foreign Application Priority Data

Mar. 31, 2006 (DE) .......................... 10 2006 015 541

(51) Int. Cl.
*B01F 15/06* (2006.01)
*B01F 3/10* (2006.01)
*B01F 7/04* (2006.01)

(52) U.S. Cl.
USPC ....................................... 366/290; 366/153.1

(58) Field of Classification Search
USPC ............ 366/209, 291, 307, 152.6, 153.1, 77, 366/76.2, 76.93, 290
See application file for complete search history.

(56) References Cited

U.S. PATENT DOCUMENTS

| | | | | |
|---|---|---|---|---|
| 2,740,696 A | * | 4/1956 | Longwell | 422/134 |
| 2,893,851 A | * | 7/1959 | Georgian | 422/139 |
| 3,578,740 A | * | 5/1971 | Redding et al. | 425/84 |
| 3,619,145 A | * | 11/1971 | Crawford et al. | 422/134 |
| 3,678,021 A | * | 7/1972 | Chatelain et al. | 526/65 |
| 3,880,407 A | | 4/1975 | List | |
| 3,903,200 A | * | 9/1975 | Cincera et al. | 525/71 |
| 3,927,983 A | * | 12/1975 | Gordon et al. | 422/110 |
| 3,964,874 A | * | 6/1976 | Maruko et al. | 422/135 |
| 4,065,105 A | * | 12/1977 | Lussiez et al. | 366/348 |
| 4,141,934 A | | 2/1979 | Wingler et al. | |
| 4,154,798 A | * | 5/1979 | Bittner | 422/162 |
| 4,185,049 A | * | 1/1980 | Kruse et al. | 525/84 |

(Continued)

FOREIGN PATENT DOCUMENTS

DE    19955861    5/2001
EP    0517068     12/1992

(Continued)

OTHER PUBLICATIONS

Wang, Ning He, Polymer Extrusion Devolatilization, Chem. Eng. Technol. vol. 24, Issue 9, 2001, p. 957.

*Primary Examiner* — Tony G Soohoo
(74) *Attorney, Agent, or Firm* — Bachman & LaPointe, P.C.

(57) ABSTRACT

In a process for treating viscous products, especially for performing polymerization processes, especially for homo- or copolymerizing thermoplastics and elastomers, wherein monomer(s) and/or catalysts and/or initiators are added to a backmixed mixing kneader, especially with a length/diameter ratio of 0.5-3.5, heat is supplied to the product which is backmixed with already reacted product and the reacted product is removed from the mixing kneader, the product in the mixing kneader shall be heated up to its boiling temperature, portions of the product shall be evaporated and exothermicity of the product shall be absorbed by evaporative cooling.

7 Claims, 1 Drawing Sheet

(56) References Cited

U.S. PATENT DOCUMENTS

| | | | |
|---|---|---|---|
| 4,200,614 A * | 4/1980 | Colburn et al. | 422/134 |
| 4,363,784 A * | 12/1982 | Hilbig et al. | 422/134 |
| 4,424,301 A * | 1/1984 | Klippert et al. | 525/53 |
| 4,452,750 A * | 6/1984 | Handwerk et al. | 264/40.3 |
| 4,460,278 A * | 7/1984 | Matsubara et al. | 366/149 |
| 4,483,624 A * | 11/1984 | Bacon et al. | 366/293 |
| 4,541,724 A * | 9/1985 | Cornelissen | 366/290 |
| 4,729,877 A * | 3/1988 | Hennig et al. | 422/134 |
| 4,732,263 A * | 3/1988 | Storimans Franciscus | 198/550.13 |
| 4,734,263 A * | 3/1988 | Gerking et al. | 422/135 |
| 4,826,324 A * | 5/1989 | Kunz et al. | 366/99 |
| 4,890,996 A * | 1/1990 | Shimizu | 425/145 |
| 5,121,992 A * | 6/1992 | List et al. | 366/303 |
| 5,157,054 A * | 10/1992 | Herbolzheimer et al. | 518/700 |
| 5,348,982 A * | 9/1994 | Herbolzheimer et al. | 518/700 |
| 5,372,418 A | 12/1994 | Biesenberger et al. | |
| 5,458,474 A * | 10/1995 | Neubauer et al. | 425/202 |
| 5,462,426 A * | 10/1995 | Imamura | 425/190 |
| 5,514,750 A * | 5/1996 | Cantrill et al. | 525/52 |
| 5,574,129 A * | 11/1996 | Miyoshi et al. | 528/354 |
| 5,921,675 A * | 7/1999 | Zikeli et al. | 366/186 |
| 6,019,916 A * | 2/2000 | Mizuguchi et al. | 264/39 |
| 6,039,469 A | 3/2000 | Palmer | |
| 6,710,141 B1 | 3/2004 | Heide et al. | |
| 6,919,130 B2 * | 7/2005 | Tokarsky et al. | 428/357 |
| RE39,073 E * | 4/2006 | Herbolzheimer et al. | 518/700 |
| 7,145,028 B2 * | 12/2006 | Geisberger et al. | 556/479 |
| 7,488,774 B2 * | 2/2009 | Berti et al. | 525/53 |
| 8,137,600 B2 * | 3/2012 | Pierick et al. | 264/45.1 |
| 8,222,355 B2 * | 7/2012 | Fleury et al. | 526/88 |
| 2004/0191123 A1 * | 9/2004 | Collin | 422/68.1 |
| 2006/0010714 A1 * | 1/2006 | Carin et al. | 34/514 |
| 2007/0109911 A1 * | 5/2007 | Neubauer | 366/77 |
| 2008/0188950 A1 * | 8/2008 | Fleury et al. | 623/55 |
| 2009/0192631 A9 * | 7/2009 | Fleury et al. | 623/55 |
| 2010/0022764 A1 * | 1/2010 | Otoshi et al. | 536/68 |
| 2011/0105716 A1 * | 5/2011 | Stuetzle et al. | 528/354 |
| 2011/0172383 A1 * | 7/2011 | Yeh et al. | 526/348 |
| 2012/0217330 A1 * | 8/2012 | Fleury et al. | 241/101.8 |

FOREIGN PATENT DOCUMENTS

| | | | |
|---|---|---|---|
| EP | 1127609 | | 8/2001 |
| GB | 1524433 | | 9/1978 |
| WO | 2006034875 | | 4/2006 |
| WO | WO 2006/034875 | * | 4/2006 |
| WO | WO 2006/129824 | * | 12/2006 |

* cited by examiner

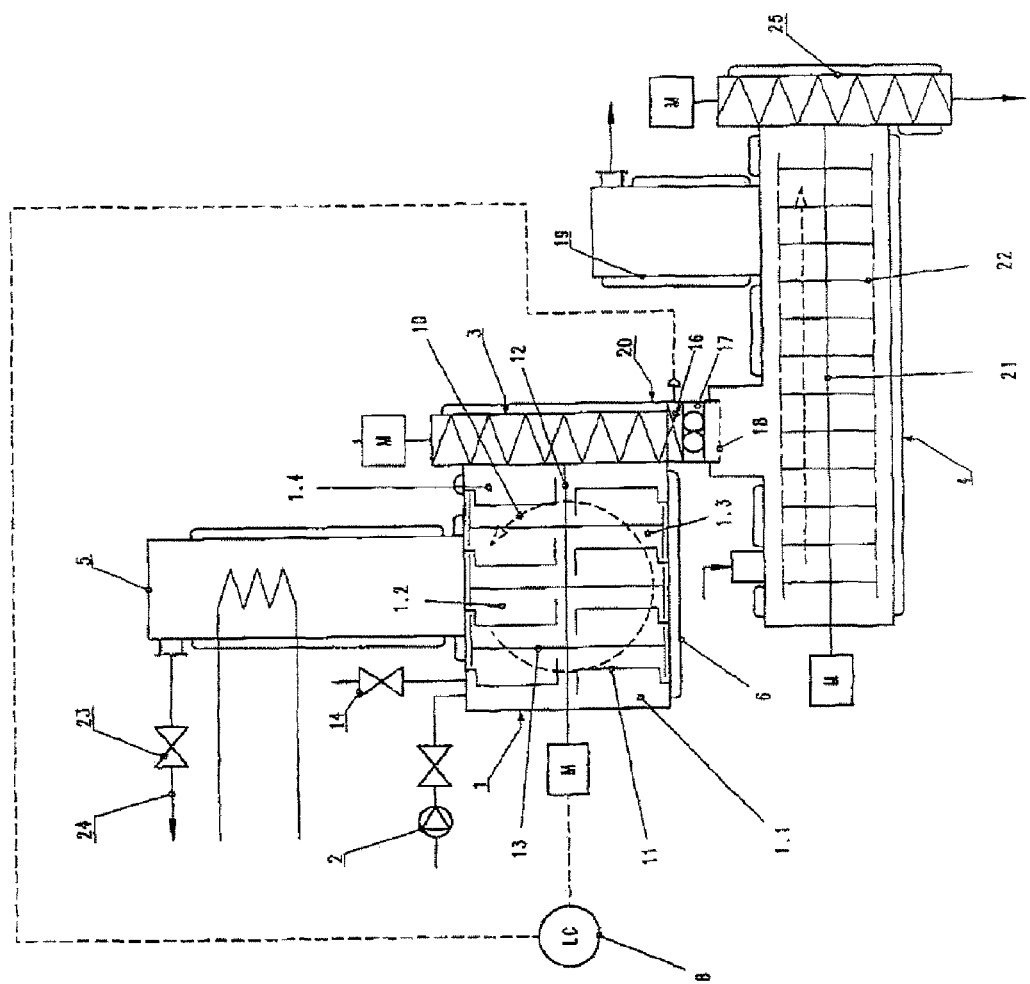

PROCESS AND APPARATUS FOR TREATING VISCOUS PRODUCTS

BACKGROUND OF THE INVENTION

This invention relates to a process for treatment of viscous products, in particular for performance of polymerization processes, in particular for homo- or copolymerization of thermoplastics and elastomers, wherein monomer(s) and/or catalysts and/or initiators are added to a backmixed mixing kneader, in particular having a length/diameter ratio of 0.5-3.5, heat is supplied to the product, and backmixed with already reacted product, and the reacted product is withdrawn from the mixing kneader, and to apparatus therefor.

A considerable proportion of polymerization reactions, in particular for production of homo- and copolymeric thermoplastics and elastomers, are commercially performed as a slurry or solution process in one or more series-connected, continuous-flow, backmixed, vertical stirred tank reactors known as CSTRs.

These stirred tank reactors have the task of ensuring that the monomers, the catalysts and initiators be distributed in a solvent/diluent under precisely defined processing conditions, such as temperature and pressure, as homogeneously as possible in order that the reaction may proceed in a policed manner, that a uniform product quality having the desired molar mass may be formed and that, in addition, the heat of reaction may be controlled.

The problem with these stirred tank reactors, then, is that only products having a low apparent viscosity can be processed. As the concentration of the polymer in the solvent/diluent increases, the apparent viscosity of the reaction mass increases to such an extent that the stirrer ultimately cannot generate sufficient convective flow. The consequence thereof is an inhomogeneous distribution on the part of the monomers. This leads to clumping, poor molar mass distribution, caking, local overheating up to and including a runaway reaction for the entire reactor contents.

A further problem with stirred tank reactors is that some products give rise to foaming, which can lead to blockages in the vapor outlet ports.

The abovementioned processing risks explain why stirred tank reactors can only be operated with a large excess of solvent/diluent of up to about 90% of the reaction mass, or only conversions of less than 50% are achievable in the case of bulk polymerizations. As a consequence thereof, additional operations become necessary for mechanical/thermal removal of the diluent/solvent/monomer or for postreaction. This is generally accomplished in dewatering screws, evaporation and drying systems, and also ripening tanks. They require high capital, energy and operating costs. Moreover, there are new polymers which are not processable using a water stripping process.

Bulk polymerizations are also performed continuously in single- or multi-shaft extruders (for example from Werner Pfleiderer, Buss-Kneter, Welding Engineers, etc.). These apparatuses are designed for polymerizations in the viscous phase up to high conversions. They are constructed as continuous plug-flow reactors and accordingly have a large L/D ratio of from >5 to about 40.

Here the following problems arise:

a) In the case of slow polymer reactions with reaction times >5 minutes during which the reaction mass remains in the liquid state for a long period, plug flow cannot be maintained. The very different rheological properties between the monomers and polymers prevent uniform product transportation, and this leads to undesirable fluctuations in quality.

b) The substantial exothermicity of many polymerization processes and also the dissipated kneading energy frequently make it necessary to remove these energies via evaporative cooling. In evaporative cooling, some of the monomer or of an admixed solvent/diluent is evaporated, condensed in an external condenser and returned as condensate into the reactor. Owing to the large L/D ratio and the large screw cross-section necessitated by the design, only very limited free cross-sectional areas are available for the withdrawal of vapors. This leads to the undesirable entrainment of polymers into the vapor lines and into the reflux condenser and, as a consequence thereof, to blockages.

c) An additional complicating factor with the production of (co)polymers from two or more different monomers is that it is mainly the monomer which has the lowest evaporating point that evaporates for the evaporative cooling, so that there is a shift in the monomer concentrations in the reactor, in particular in the region of the entry orifice for the condensate reflux. This is generally undesirable.

d) It is also disadvantageous that the free product volume of screws is limited to about 1.5 $m^3$ for mechanical engineering reasons, so that only low throughputs can be achieved in the case of reactions having residence times >5 minutes, which requires the installation of a plurality of parallel lines at correspondingly high capital and operating costs.

A further way of performing bulk polymerizations up to high conversions is described in U.S. Pat. No. 5,372,418. Here, co- or contrarotating multi-screw extruders having non-meshing screws, or pairs of screws, which convey in opposite directions are described for the polymerization of monomers by backmixing with the polymer in the viscous phase. These apparatuses are in principle capable of performing polymerization processes up to high conversions and at the same time of avoiding the above-described disadvantages a) (collapse of plug flow) and c) (recipe shift through reflux) of the plug-flow extruder. However, the above-described problems b) (reduced free cross-section) and d) (capacity) still remain unsolved.

The abovementioned processes are also carried out in so-called mixing kneaders in which appropriate kneading and transporting elements transport the product from an inlet to an outlet and at the same time ensure that the product comes into intensive contact with the heat-exchanging surfaces. Such mixing kneaders are described for example in DE patent 23 49 106, EP 0 517 068 A1 and DE 195 36 944 A1.

SUMMARY OF THE INVENTION

In accordance with the present invention, we have found that the object is achieved when the product in the mixing kneader is heated to its boiling temperature, portions of the product are vaporized and an exotherm of the product is absorbed by evaporative cooling.

This means that the heating of the product to its boiling temperature is utilized not only for vaporizing corresponding solvents, catalysts and/or initiators or the like, but also to condense, i.e., cool, some or all of the vaporized products and return them as condensate into the mixing kneader. Since product in the mixing kneader has a large surface area, the condensate can form a film over the entire area of the product and thus lead to efficient cooling. Preferably, the condensate is returned at the location of the vaporization itself. When, for example, the mixing kneader is subdivided into a plurality of chambers or open cells, it will likely be advisable also to provide a corresponding number of vapor domes through which the condensing fractions of product are withdrawn.

The condensate is then also fed back into the mixing kneader at this location of the vapor domes.

The optimal boiling temperature is adjusted according to the product, by varying the pressure. It is known, for example, that PMMA (polymethyl methacrylate) has an optimal boiling temperature of 160° C. at 3.5 bar. Below this temperature, the viscosity increases, which has a deleterious effect on the torque to be accommodated; above the temperature, there is a risk of depolymerization.

A preferred build-up of a vacuum for withdrawing vapors in the mixing kneader has the advantage that air and inert gas, for example nitrogen, is withdrawn, but volatilizing monomer condenses in the condenser and can be fed back into the mixing kneader for cooling.

In a further illustrative embodiment of the process, for which independent protection is sought but which is particularly effective to carry out in connection with the process thus described, the product is to be backmixed until it has reached a predetermined viscosity and this viscosity is maintained by continuous addition of further monomer and/or catalysts and/or initiators.

A low viscosity is an indication to the operator of a corresponding mixing kneader that there is only or essentially monomer in the mixing kneader that is liquid. As the polymerization progresses, the more the viscosity increases. Once the product has reached a predetermined viscosity, this is a signal for the fact that a certain percentage of the product has become transformed into polymer. This is a signal to operate the mixing kneader in a continuous process, such that the viscosity and hence the conversion/degree of polymerization remains the same. Essentially, this is determined by reference to the torque. In the case of PMMA, which is processed under 3.5 bar at 160° C. reaction temperature and 30 revolutions of the shaft per minute, a viscosity plateau at which changeover to continuous operation is effected is attained at a torque of 100 Nm.

The process of the invention is additionally improved by a further step when the product is vaporized, by energy input consisting of mechanical kneading energy and heat transfer via contact with kneader heat-exchange surfaces, up to just above the point of collapse of the vaporization rate, and the thus pre-evaporated viscous bed of product is continuously admixed with new low-viscous product solution such that the vaporization rate remains above the point of collapse.

If the product is initially still very liquid on account of the high solvent content, the vaporizing essentially takes place via the contact heat which comes from a heated housing shell, a heated shaft and/or heated kneading counter-elements. The greater the viscosity of the product due to evaporation, the more the contact heat transfer decreases and the more the shearing heat increases, the sum total of the two passing through a maximum. However, once the percentage of liquid constituents has been diminished by a certain extent, the vaporization rate decreases very appreciably, since it is no longer possible for sufficient solvent to come up in the interior of the product to the surface. According to the invention, therefore, the proportion of, for example, solvents shall be maintained in a processing range which is close to the maximum but absolutely still above this point of collapse of the vaporization rate.

This process of the invention provides the advantage that, at the enhanced mechanical intensity, any foaming due to the flash addition of the product into the mixing kneader is disrupted, which further improves the heat energy input. The vaporization energy needed for evaporation is accordingly maximized by the combination of contact heat and shearing heat. The possibility of keeping the product temperature constant via the vaporization of solvent allows a high degree of freedom in relation to the regulation of the shearing heat via the rotary speed (shear gradient) and the fillage of the mixing kneader.

When, in a preferred illustrative embodiment, a second mixing kneader, extruder or the like follows, devolatilization takes place in it additionally. For example, in such an extruder, the product can be subjected to plug flow via an appropriate geometry on the part of the kneading elements. Mass-transfer-limited evaporation takes place in this extruder, which therefore preferably takes the form of two-shaft mixing kneaders which are described in the prior art.

In this mixing kneader with plug flow, it is essential that the surface of the product be renewed as quickly as possible, since the liquid evaporates off this surface. Since the evaporation sites retreat more and more into the product interior, the product surface has to be permanently renewed by more intensive kneading. Another requirement is good product temperature policing.

The need for a larger product surface area can also be met in particular by the product being comminuted, for example via an appropriate perforated plate as comminuting device, before entry into the extruder. When the product after discharge from the mixing kneader is forced, for example by a gear pump, through the perforated plate, it will pass into the extruder in spaghetti-like form, which results in the formation of a very large surface area. However, the concept of the invention shall comprehend other comminuting devices as well. Heat absorption is self-evidently also improved by the larger surface area.

A throttle valve upstream of the gear pump cooperates with a fill level indicator for the mixing kneader and thereby ensures that the product contents are kept approximately constant in the mixing kneader itself. At the same time, the gear pump and the throttle valve serve to block any transfer from the mixing kneader into the extruder and vice versa. In this way, for example, the mixing kneader can be operated under reduced pressure and the extruder under superatmospheric pressure, or vice versa.

BRIEF DESCRIPTION OF THE DRAWINGS

Further advantages, features and details of this invention will be apparent from the following description of a preferred illustrative embodiment and also from reference to the drawing; it shows in its single figure a schematic depiction of a plant for treating viscous products, in particular for performing polymerization processes, which is in accordance with the present invention.

DETAILED DESCRIPTION

Monomer(s), catalysts, initiators and possibly small amounts of solvents are continuously metered into a single-shaft mixing kneader 1 equipped with backmixing stirrer shaft geometry, surrounded by a heating jacket 6 and partly filled with reacted product, via appropriate metering devices 2 and backmixed in the processing space. This is indicated by the broken-line arrow 10. The mixing kneader 1 is subdivided into four chambers which are formed by cooperating kneading counter-elements 11 and, mounted on a shaft 12, kneading elements 13. Here the term "chamber" shall be understood as meaning not closed chambers but open cells between which the product can be backmixed.

The reaction product is withdrawn by means of an attached discharging device 3. Its motor M is connected to a measuring device 8 for the fillage of the mixing kneader 1. The withdrawing is preferably effected such that the fillage in the mixing kneader 1 remains constant.

The viscosity of the reaction mass in the mixing kneader 1 is adjusted through the choice of the reaction parameters, throughput, temperature, pressure and so on, such that the product is directly devolatilized in a subsequent LIST residual devolatilizer or extruder 4, or the unreacted monomer can be reacted to completion in a downstream apparatus, for example a ripening tank.

Reaction temperature and reaction pressure are preferably chosen such that the monomer excess or the solvent content is in the boiling range. The appropriate temperature range depends on the product itself.

For example, the boiling temperature of a certain monomer can be optimal at 160° C. and a pressure of 3.5 bar, i.e., the monomer still has a relatively low viscosity, so that the shaft 12 has to accommodate relatively little torque. In this case, the optimal reaction temperature is at this temperature and this pressure.

If this product were to be treated under a pressure of 2 bar only, for example, the boiling temperature will be 140° C., for example, which leads to a higher product viscosity, so that a higher torque would have to be accommodated for the shaft 12, and this is altogether worse for the process.

If, however, the pressure were to be increased to 4 bar, for example, the boiling temperature would be 180° C., and at this temperature an undesirable depolymerization occurs.

This process just described makes it possible to remove the heat of reaction and the dissipated kneading energy through the vaporization of the solvent/monomer. This vapor is condensed in a reflux condenser 5 donned on the kneader 1, and returned into the reaction mass. It is also possible for a plurality of reflux condensers to be distributed along the length of the mixing kneader 1. It is conceivable, in particular, that each chamber is assigned a reflux condenser.

The condensation can incidentally also be realized externally, and the condensate is metered with various nozzles back into the monomer/polymer mass in a homogeneous manner. The small L/D (length/diameter) ratio of preferably 0.5 to 3.5 of the mixing kneader 1 causes the backflowing condensate to be mixed optimally uniformly back in the reactor, and this is an immense problem with previously used backmixing extruders having a large L/D ratio.

The backmixed mixing kneader 1 can operate under reduced pressure, under atmospheric pressure or under superatmospheric pressure. In the case of polymerization systems which are operated under reduced pressure, a valve 23 is opened and the line 24 is attached to a vacuum pump. In this way, air and nitrogen as inert gas is withdrawn, but the monomer condenses in the condenser 5 and can pass back into the mixing kneader 1.

For polymerization systems which are operated under atmospheric pressure, the valve 23 is opened and the line is left under these atmospheric conditions.

For polymerization systems which are operated at pressures higher than ambient pressure, preference is given to controlling the system pressure to a particular value with an inert gas (nitrogen for example), and this is done by means of a valve 14. The valve 23 is closed in this case.

A discharge of the discharging device 3 is followed by a throttle valve 16 which in turn is followed by a gear pump 17. Throttle valve control is likewise effected in agreement with the fill level of the mixing kneader 1, as determined via the measuring device 8. The gear pump 17 is followed by a perforated plate 18, through which product can be introduced from the discharging device 3 into the extruder 4 in spaghetti-like form.

An arrow 20 ahead of the throttle valve 16 indicates that, in this region, it is also possible for a stripping agent to be introduced into the discharging device 3.

The devolatilizer 4 is assigned a motor M via which one or more stirrer shaft(s) 21 with stirring/kneading elements 22 are driven in the devolatilizer 4. The stirrer shaft geometry is engineered so as to bring about plug flow. In addition, the devolatilizer 4 is donned with one or more vapor domes 19 via which evaporating products can be withdrawn.

The devolatilizer 4 is followed by a further discharging screw 25 which in turn is driven by a motor M.

The invention claimed is:

1. An apparatus for carrying out a polymerization process comprising:
    a mixing kneader having a backmixing stirrer shaft, wherein the mixing kneader is subdivided into a plurality of chambers and backmixing by the backmixing stirrer shaft takes place in all of the plurality of chambers; and
    a discharge device for receiving product from the mixing kneader, the discharge device has an outlet including a comminuting device for increasing the product surface area.

2. An apparatus according to claim 1 wherein an extruder is downstream of the discharge device for receiving product with increased surface area from the outlet of the discharge device, wherein the extruder includes kneading elements.

3. An apparatus according to one of claims 1 or 2 further including a gear pump upstream of the comminuting device.

4. An apparatus according to claim 3 further including a throttle valve upstream of the gear pump.

5. An apparatus according to claim 4 wherein the throttle valve is associated with an adding device for a stripping agent.

6. An apparatus according to claim 4 wherein the throttle valve is connected to a fill level meter provided in the mixing kneader.

7. An apparatus according to claim 3 wherein the comminuting device comprises a perforated plate.

* * * * *